United States Patent
Serebryakov et al.

(10) Patent No.: US 11,750,629 B2
(45) Date of Patent: Sep. 5, 2023

(54) CLASSIFICATION BASED ANOMALY DETECTION

(71) Applicant: Hewlett Packard Enterprise Development LP, Spring, TX (US)

(72) Inventors: Sergey Serebryakov, Milpitas, CA (US); Tahir Cader, Liberty Lake, WA (US); Nanjundaiah Deepak, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 105 days.

(21) Appl. No.: 17/024,884

(22) Filed: Sep. 18, 2020

(65) Prior Publication Data

US 2021/0160267 A1 May 27, 2021

(30) Foreign Application Priority Data

Nov. 21, 2019 (IN) .............................. 201941047553

(51) Int. Cl.
*H04L 9/40* (2022.01)
*H04L 43/0817* (2022.01)
*H04L 43/065* (2022.01)
*H04L 43/062* (2022.01)
*H04L 43/04* (2022.01)

(52) U.S. Cl.
CPC .......... *H04L 63/1425* (2013.01); *H04L 43/04* (2013.01); *H04L 43/062* (2013.01); *H04L 43/065* (2013.01); *H04L 43/0817* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2003/0194724 A1* | 10/2003 | Sorenson | G16B 20/20 702/20 |
| 2017/0155537 A1* | 6/2017 | Maheshwari | H04L 41/064 |
| 2019/0057314 A1 | 2/2019 | Julian et al. | |
| 2019/0124099 A1* | 4/2019 | Matselyukh | H04L 43/16 |
| 2019/0286085 A1* | 9/2019 | Kawanoue | G06F 11/0751 |
| 2019/0340094 A1 | 11/2019 | Lu et al. | |
| 2020/0145440 A1* | 5/2020 | Mohan | G06N 20/00 |

OTHER PUBLICATIONS

Wang et al., "Statistical Techniques for Online Anomaly Detection in Data Centers", Proceedings of the 8th ACM international conference on Autonomic computing, ACM, 2011, May 21, 2011, 9 pages.

* cited by examiner

*Primary Examiner* — Anh Nguyen
(74) *Attorney, Agent, or Firm* — Hewlett Packard Enterprise Patent Department

(57) ABSTRACT

An example device includes processing circuitry and a memory. The memory includes instructions that cause the device to perform various functions. The functions include receiving datastreams from a plurality of sensors of a high performance computing system, classifying each datastream of the each sensor to one of a plurality of datastream models, selecting an anomaly detection algorithm from a plurality of anomaly detection algorithms for each datastream, determining parameters of the each anomaly detection algorithm, determining an anomaly threshold for each datastream, and generating an indication that the sensor associated with the datastream is acting anomalously.

20 Claims, 5 Drawing Sheets

CLASSIFICATION BASED ANOMALY DETECTION

This invention was made with government support under DE-AC36-08GO28308 awarded by the U.S. Department of Energy. The government has certain rights in the invention.

BACKGROUND

One aspect of administering a computing system is monitoring measured characteristics of the system. These characteristics can include temperatures of components, water pressure, coolant temperature, computer device performance metrics, etc. Traditional thresholding may be sufficient for low-volatility data centers, but as changes to the data center increase (such as occurs in high performance computing, HPC, datacenters), the traditional thresholding imposes too high of a manual administrative load.

Existing technologies that reduce the manual administrative load may work in smaller deployments, but they do not scale well when the number of characteristics are in the thousands or tens of thousands.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
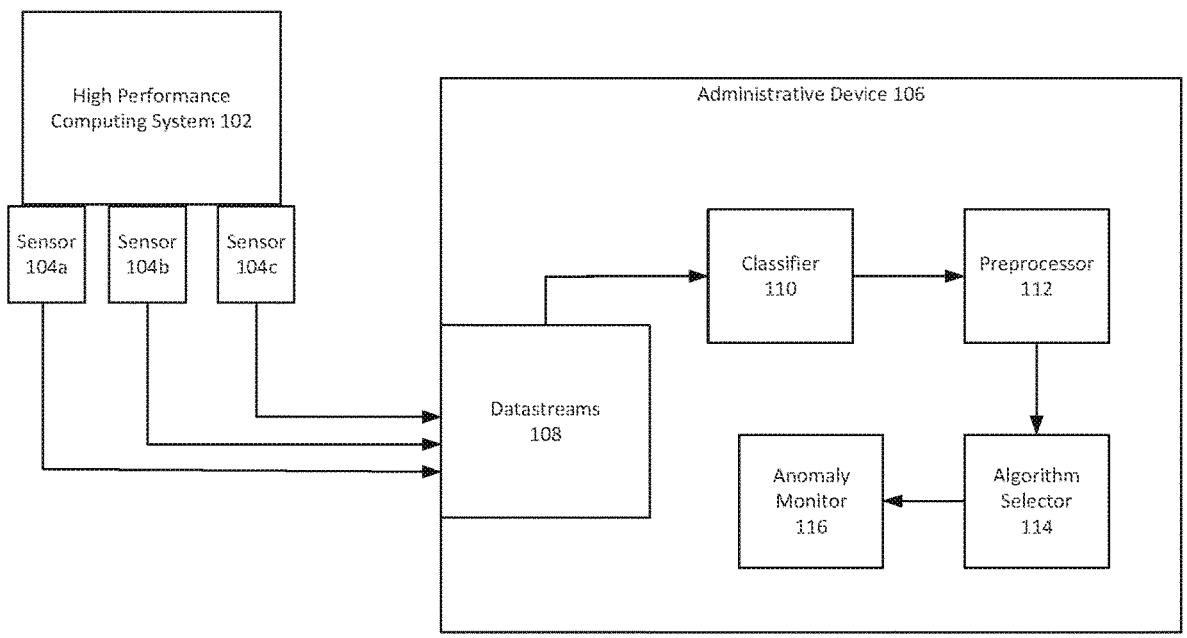
FIG. 1 illustrates an example high performance computing system including an administrative device.

Certain examples have features that are in addition to or in lieu of the features illustrated in the above-referenced figures. Certain labels may be omitted from certain figures for the sake of clarity.

DETAILED DESCRIPTION

In modern high performance computing (HPC) datacenters, the complexity of the system, from both an IT perspective and from a facilities perspective, makes it impossible for manual administration and management. For large, "exascale", HPC systems, thousands to tens of thousands of sensors may provide continuous feeds of data to an administrative device (e.g. to a data center dashboard). Simple threshold based monitoring may generate untenable amounts of false positives, and existing technologies to improve the false positive rate do not scale well with the datacenter.

In some examples, the administration device uses a classification algorithm to associate datastreams from sensors in a HPC datacenter with datastream models. For example, a binary sensor that detects whether a component is properly seated may be associated with a "discrete" model. The models describe the behavior of the datastream, rather than specific values or trends. For example, a monotonically increasing sinusoidal datastream may be associated with a sinusoidal algorithm despite a linear trend of the value over longer durations. In some examples, time-series observations within a window of duration are used in lieu of the entire set of historical values of the datastream.

Once the datastream is classified to a model, preprocessing is optionally done to the datastream to simplify anomaly detection. Preprocessing may include detrending (removing any longitudinal trends in the datastream), normalization (scaling the datastream to a pre-determined standard), and other algorithms to idealize a datastream in a way that better matches the associated model.

An anomaly detection algorithm is then selected for the datastream. In some examples, a class of anomaly detection algorithms is selected based on the model to which the datastream is classified, and parameters of the anomaly detection algorithm are populated using other characteristics (such as characteristics of the datastream, characteristics of the HPC system, etc.). For example, a datastream from a sensor that determines whether a component is properly seated may be classified as "discrete". The class of anomaly detection algorithm selected for a discrete datastream may expect normal operational values to be near 1 and near 0. Using the datastream characteristics, the algorithm may be configured to interpret signals within 0.1 of a normal operational value to be acceptably noisy. The anomaly detection algorithm then outputs an anomaly score. For example, the value of the anomaly score may be low when the value of the datastream is 0.02, but the value of the anomaly score may be high when the value of the datastream is 0.71.

Anomalies may include indications of improper operation of the system that are correctly read by a properly operating sensor, as well indications of proper operation of the system that are incorrectly read by an improperly operating sensor.

Once the anomaly score is determined, an anomaly threshold is determined based on the anomaly score. The method for determining the anomaly threshold may depend on the class of anomaly detection algorithm that generated the anomaly score. For example, if the anomaly score is expected to fit a Gaussian distribution, a threshold may be set on the z-score of the anomaly score. For example, the anomaly threshold may be set when the anomaly score reaches 3 standard deviations from the mean.

Examples consistent with this disclosure improve the administration and technology of high performance computing systems by improving accuracy of anomaly detection and alerting, by reducing computational complexity of accurate anomaly detection in large-scale datacenters, by adapting anomaly detection to changing data inputs, and by reducing manual intervention when changes are made to the datacenter.

FIG. 1 illustrates an example high performance computing system including an administrative device. System 100 includes high performance computing (HPC) system 102. HPC system 102 may be a HPC datacenter including computing devices, network infrastructure devices, components for managing such devices, and facilities for housing such devices. HPC system 102 may include any number of devices, and may be scaled from relatively small sites to "exascale" sites with thousands of devices. HPC system 102 includes sensors 104 that monitor properties of the HPC system 102. Properties may be component related (e.g. CPU temperature, fan speed), facility related (e.g. liquid cooling valve position, water temperature), device related (e.g. water temperature at server 14, operational status of top of rack switch), or other relevant metrics for the operation of the HPC system 102. Sensors 104 may be analog devices or digital devices that are susceptible to noise being introduced into the datastream from the sensor to the administrative device, as well as to occasional hardware failures. Generally, noise introduced into the datastream does not generate concern that the operation of the HPC system 102 is impaired. However, hardware failure, whether they be the sensor 104 itself or a component under measure by the sensor 104, may substantially impact the operation of HPC system 102.

Administrative device 106 receives datastreams 108 from sensors 104. Datastreams 108 are classified using classifier 110. Classifier 110 may be a machine learning classifier algorithm or another algorithm capable of correctly classifying a datastream 108 as a datastream model of a set of datastream models. Datastream models are characterizations of the behavior of a datastream 108. There may be any number of datastream models depending on the types of datastreams 108 received at administrative device 106. Some example datastream models include a discrete model for binary datastreams 108, a step model for datastreams 108 whose values change incrementally over time, and an irregular model for datastreams 108 that vary drastically over time. Each datastream model may apply to multiple datastreams 108, and may apply to datastreams 108 that have different values and characteristics, but all behave consistently with the model.

Information about datastreams 108 may be determined and calculated to determine which datastream model to classify datastream 108 under. In some examples, datastreams 108 are continuous feeds of information that are stored in administrative device 106. In certain examples, a portion of datastream 108, such as a set of time-series observations over a pre-determined duration window, may be passed to classifier 110 instead of the entirety of datastream 108. For example, the most recent six hours of observations for a datastream 108 may be passed to classifier 110. Time-series observations may occur periodically. Classification may occur based on characteristics both in the time domain and in the frequency domain. Certain transformation may occur to datastreams 108 prior to classification, such as Fourier transforms. Certain datastreams 108 may include multiple metrics. For example, a datastream 108 may correspond to a group of related sensors, and each metric of the datastream 108 corresponds to a respective sensor of the group of related sensors.

In some examples, the classified datastreams 108 are provided to a preprocessor 112. Preprocessor 112 may transform each datastream 108 so that the datastream 108 better matches the associated model. Preprocessing may include one or more transformation functions, including detrending and normalizing. Detrending removes any long term trend in datastream 108. For example, if datastream 108 has a sinusoidal pattern and is monotonically increasing linearly, removing the linear monotonic increase from datastream 108 may cause datastream 108 to better match its corresponding model. Likewise, normalization of datastream 108 may adjust the magnitude of values of datastream 108 to better fit the corresponding model.

Datastream 108 is then provided to algorithm selector 114. Algorithm selector 114 selects an anomaly detection algorithm based on the model corresponding to datastream 108. Depending on the characteristics of datastream 108, different algorithms detect anomalies slightly differently. For example, an anomaly detection algorithm for a binary datastream 108 may output a low anomaly score for datastream values near 0 or near 1, and may output a high anomaly score for datastream values further away from 0 or 1 (such as 0.4). An anomaly detection algorithm for a datastream 108 exhibiting Gaussian noise may output a low anomaly score for datastream values near the mean, and may output a high anomaly store for datastream values far from the mean. Although the classification of datastream 108 informs the type of anomaly detection algorithm to use, additional characteristics of datastream 108 (e.g. frequency, amplitude) and additional characteristics of HPC system 102 (e.g. sensor type, device type) to determine specific parameters of the anomaly detection algorithm. In some examples, the anomaly detection algorithm outputs a binary anomaly score indicating whether datastream 108 has an anomalous value at a certain time. In some other examples, the anomaly detection algorithm outputs an anomaly score that is related to how normal or anomalous a value of datastream 108 is at a certain time. The anomaly score may be provided to anomaly monitor 116 for further processing.

Anomaly monitor 116 may determine a threshold for the anomaly score based on the type of anomaly detection algorithm. For example, if the anomaly score for a datastream 108 classified as a Gaussian noise function is a z-score of the datastream 108, anomaly monitor 116 may set a threshold of 3 standard deviations from the mean. Therefore, if the anomaly score exceeds a value corresponding to 3 standard deviations, datastream 108 is considered to be anomalous at that point in time. Anomaly monitor 116 may, upon determining that a value of datastream 108 exceeds its anomaly threshold, generate an indication that the sensor 104 associated with datastream 108 is acting anomalously. In some examples, a message may be forwarded to a network administrator containing the indication of the anomaly.

In certain examples, more than one anomaly may occur in quick succession. In such examples, multiple anomalies may be grouped into an anomaly region, and anomaly monitor 116 may generate an indication for the anomaly region in lieu of generating indications for each individual anomaly of the anomaly region. Anomaly monitor 116 may then forward the indication of the anomaly region to a network administrator.

Certain datastreams 108 may change characteristics over time. To ensure that false positives are not being received for a changing datastream 108, datastream 108 may be reclassified by classifier 110 periodically. Reclassification may be triggered by expiration of a timer, significant alteration of characteristics of datastream 108, manual initiation of reclassification by a network administrator, or any other appropriate trigger. In some examples, reclassification of datastream 108 comprises preprocessing, algorithm selection, and anomaly monitoring as described above.

Figure 2:
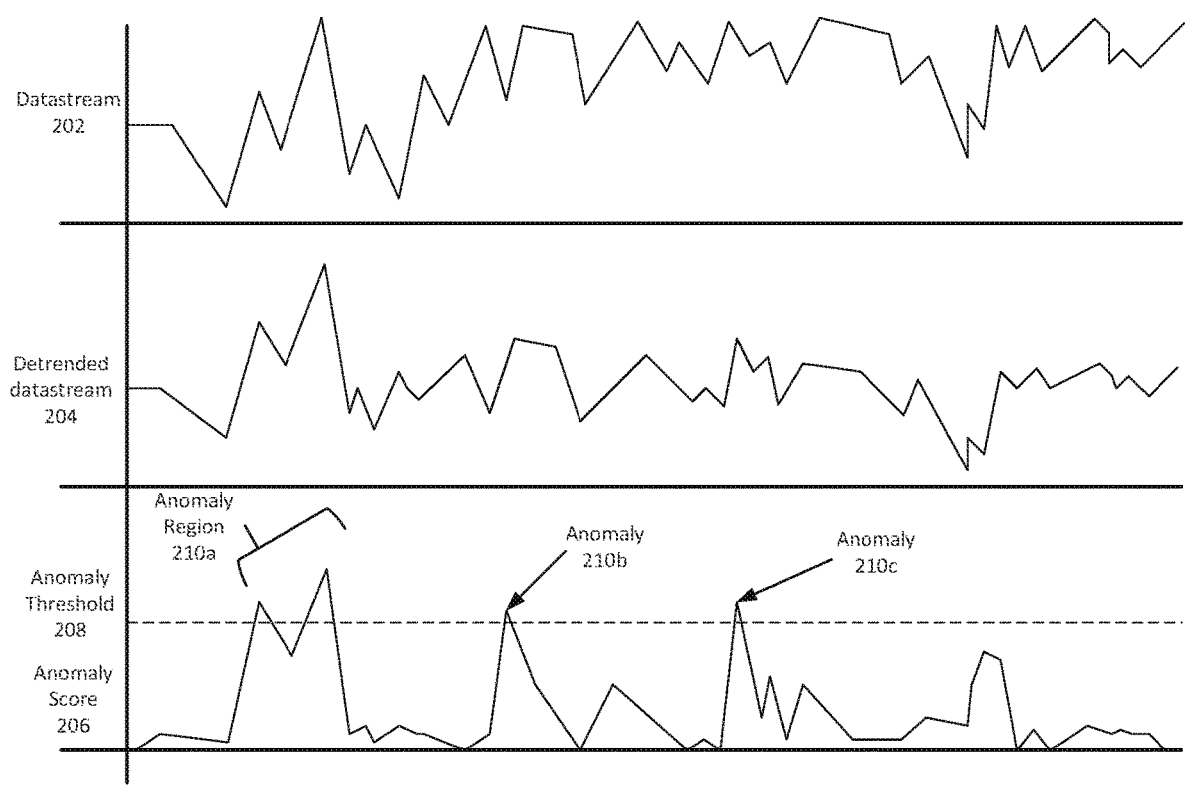
FIG. 2 illustrates an example datastream.

FIG. 2 illustrates an example datastream. Datastream 202 is an example datastream from a sensor in a HPC datacenter. Although datastream 202 does not represent actual data from a real world sensor, datastream 202 provides an exemplary illustration of a datastream from a sensor that may be having hardware issues. Datastream 202 may be received at an administrative device and classified based on an associated datastream model. For example datastream 202 may be classified as a step datastream model. Datastream 202 may include a linear upward value trend component as well as a noise component. Datastream 202 may be preprocessed using a detrending algorithm to remove the linear upward value trend component, resulting in detrended datastream 204.

Detrended datastream 204 retains the noise component of datastream 202, but has removed the linear upward value trend component, resulting in a signal that is easier to analyze for anomalies. Rather than comparing datastream 202 to a linear regression line (although linear detrending is shown in FIG. 2, other forms of detrending, such as geometric detrending, are contemplated as well), values of detrending datastream 204 can be compared to a single mean value. In the example of FIG. 2, the anomaly detection algorithm may simply compute an absolute value difference between the single mean value and the value of detrended datastream 204 at each time to generate anomaly score 206.

It should be noted that while anomaly score 206 generally corresponds to a distance from the mean of detrended datastream 204, the anomaly score 206 shown in FIG. 2 may not be entirely accurate. Once anomaly score 206 is calculate, the administrative device may determine an anomaly threshold 208. Anomaly threshold 208 may be determined based on the type of anomaly detection algorithm used on datastream 202. Anomaly threshold 208 may be determined using a mathematical formula, using the benefit of domain knowledge relating to the specific datastream 204 (e.g. network administrator input into expected behavior of the datastream), or any other appropriate method for determining an anomaly threshold. In the example where the noise component of detrended datastream 204 is determined to be a Gaussian noise function, anomaly score 206 may correspond to a z-score of detrended datastream 204 and anomaly threshold 208 may correspond to a certain number of standard deviations away from the mean. For example, anomaly threshold 208 may correspond to a z-score of 3 (3 standard deviations from the mean).

Anomalies 210 may be detected where anomaly score 206 exceeds anomaly threshold 208. In some examples, multiple anomalies may be grouped into an anomaly region 210a. Indications are generated when anomalies 210 occur, but in some examples, only a single indication is generated for an anomaly region 210a.

Figure 3:
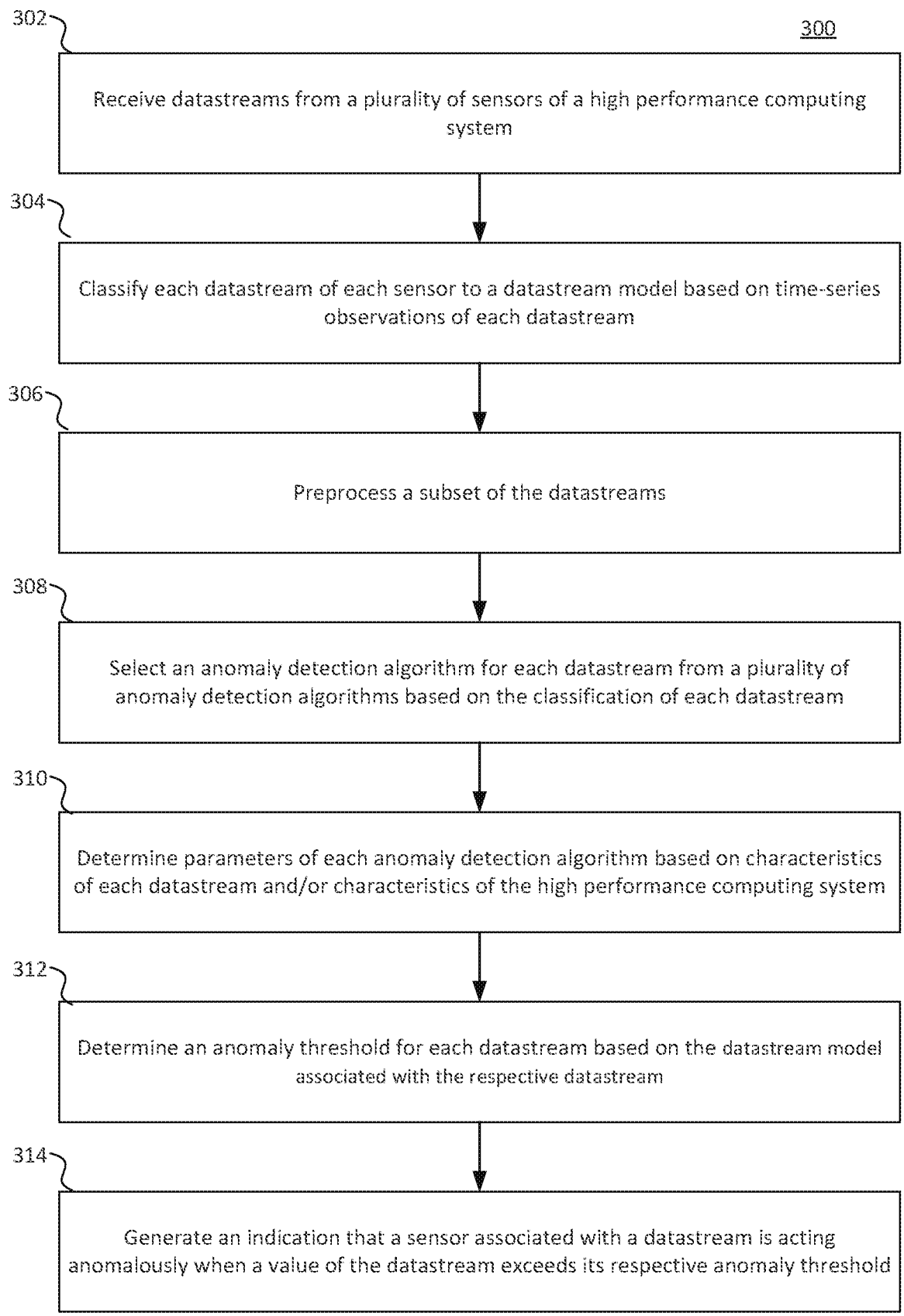
FIG. 3 is a flowchart illustrating an example method for detecting sensor anomalies.

FIG. 3 is a flowchart illustrating an example method for detecting sensor anomalies. As previously described, sensor anomalies may include anomalous operation of a device or component of the system and/or an improperly behaving sensor. In some examples, method 300 is encoded as instructions in a memory of a device and the instructions are executed by processing circuitry that causes the device to perform the blocks of method 300.

In block 302, datastreams are received from a plurality of sensors of a HPC system. In some examples, each datastream corresponds to a respective sensor. In some other examples, certain datastreams include multiple metrics, each of which correspond to a respective sensor. Datastreams may be received via a management network through a network interface card of the device. In some examples, certain sensors may be directly connected to the device via a serial data connection.

In block 304, each datastream of each sensor is classified to a datastream model based on time-series observations of each datastream. In some examples, a library of datastream models is maintained on the device. A machine learning classifier may be used to classify each datastream to a datastream model.

In block 306, certain datastreams are preprocessed. In some examples, the certain datastreams are classified to certain datastream models. For example, datastreams classified to a step model may be preprocessed. Preprocessing may include transforming the datastream to make anomaly detection easier. For example, a datastream may be detrended, normalized, or transformed in any other appropriate manner.

In block 308, an anomaly detection algorithm for each datastream is selected from a plurality of anomaly detection algorithms based on the classification of each datastream. In some examples, a class of anomaly detection algorithms is selected based on the classification of the respective datastream.

In block 310, parameters of each anomaly detection algorithm are determined based on additional system information, such as characteristics of each datastream and characteristics of the HPC system. The additional system information may include any information from within the system or about the system (e.g. domain knowledge) that is appropriate for determining parameters of an anomaly detection algorithm. In some examples, parameters such as frequency, amplitude, phase, and other relevant parameters are determined from the aforementioned characteristics.

In block 312, an anomaly threshold is determined for each datastream based on the datastream model associated with the respective datastream. In some examples, since the anomaly detection algorithm is selected based on the datastream model associated with the respective datastream, the anomaly threshold is determined based on the respective anomaly detection algorithm. In some examples, the anomaly threshold is determined in relation to a mean value of an anomaly score generated by the anomaly detection algorithm. For example, if the anomaly score is a z-score of a datastream classified as a Gaussian noise function, the anomaly threshold may be set at a certain number of standard deviations from the mean.

In block 314, an indication that a sensor associated with a datastream is acting anomalously is generated when a value of the datastream exceeds its respective anomaly threshold. In some examples the value of the datastream exceeds the anomaly threshold indirectly. In such examples, the anomaly score may be determined by the anomaly detection algorithm, and the value of the anomaly score may be related to the value of the datastream. For example, the value of the anomaly score may be an absolute value of a difference between the value of the datastream at a certain time compared to a mean value. In such examples, the anomaly score may be compared to the anomaly threshold in lieu of the datastream.

Figure 4:
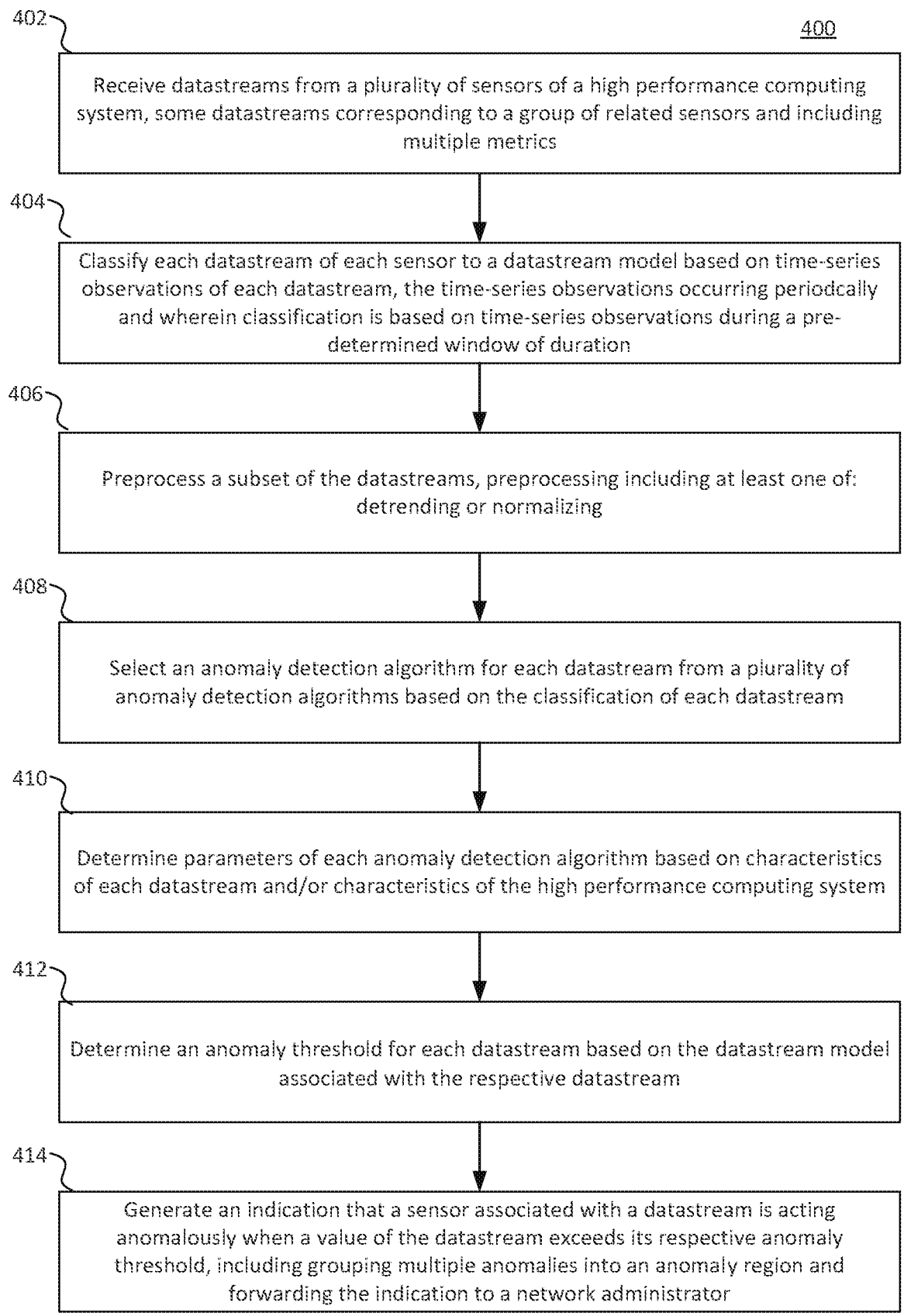
FIG. 4 is a flowchart illustrating another example method for detecting sensor anomalies.

FIG. 4 is a flowchart illustrating another example method for detecting sensor anomalies. As previously described, sensor anomalies may include anomalous operation of a device or component of the system and/or an improperly behaving sensor. In some examples, method 400 is encoded as instructions in a memory of a device and the instructions are executed by processing circuitry that causes the device to perform the blocks of method 400.

In block 402, datastreams are received from a plurality of sensors of a HPC system. In some examples, each datastream corresponds to a respective sensor. In some other examples, certain datastreams correspond to a group of related sensors and include multiple metrics, each of which correspond to a respective sensor of the group of related sensors. Datastreams may be received via a management network through a network interface card of the device. In some examples, certain sensors may be directly connected to the device via a serial data connection.

In block 404, each datastream of each sensor is classified to a datastream model based on time-series observations of the each datastream. In some examples, a library of datastream models is maintained on the device. A machine learning classifier may be used to classify each datastream to a datastream model. The time-series observations of the datastream occur periodically and the classification is based on time-series observations during a pre-determined window of duration.

In block 406, certain datastreams are preprocessed. In some examples, the certain datastreams are classified to certain datastream models. For example, datastreams classified to a step model may be preprocessed. Preprocessing may include transforming the datastream to make anomaly detection easier.

For example, a datastream may be detrended, normalized, or transformed in any other appropriate manner.

In block 408, an anomaly detection algorithm is selected from a plurality of anomaly detection algorithms for each datastream based on the classification of each datastream. In some examples, a class of anomaly detection algorithms is selected based on the classification of the respective datastream.

In block 410, parameters of each anomaly detection algorithm are determined additional system information, such as characteristics of each datastream and characteristics of the HPC system. The additional system information may include any information from within the system or about the system (e.g. domain knowledge) that is appropriate for determining parameters of an anomaly detection algorithm. In some examples, parameters such as frequency, amplitude, phase, and other relevant parameters are determined from the aforementioned characteristics.

In block 412, an anomaly threshold is determined for each datastream based on the datastream model associated with the respective datastream. In some examples, since the anomaly detection algorithm is selected based on the datastream model associated with the respective datastream, the anomaly threshold is determined based on the respective anomaly detection algorithm. In some examples, the anomaly threshold is determined in relation to a mean value of an anomaly score generated by the anomaly detection algorithm. For example, if the anomaly score is a z-score of a datastream classified as a Gaussian noise function, the anomaly threshold may be set at a certain number of standard deviations from the mean.

In block 414, an indication that a sensor associated with a datastream is acting anomalously is generated when a value of the datastream exceeds its respective anomaly threshold. The indication may be forwarded to a network administrator. In some examples the value of the datastream exceeds the anomaly threshold indirectly. In such examples, the anomaly score may be determined by the anomaly detection algorithm, and the value of the anomaly score may be related to the value of the datastream. For example, the value of the anomaly score may be an absolute value of a difference between the value of the datastream at a certain time compared to a mean value. In such examples, the anomaly score may be compared to the anomaly threshold in lieu of the datastream. In some examples, calculation of the anomaly score and comparison of the anomaly score to the anomaly threshold occurs continuously as additional time-series observations of the datastream are received at the device. In some examples, multiple anomalies that occur in rapid succession are grouped together into an anomaly region, and a single indication is generated for the anomaly region and forwarded to a network administrator.

In some examples, a datastream is periodically reclassified based on the expiration of a timer, a significant alteration of characteristics of the datastream, or manual initiation by a network administrator. In certain examples, reclassification of the datastream includes determining a new anomaly detection algorithm for the datastream based on the new classification.

Figure 5:
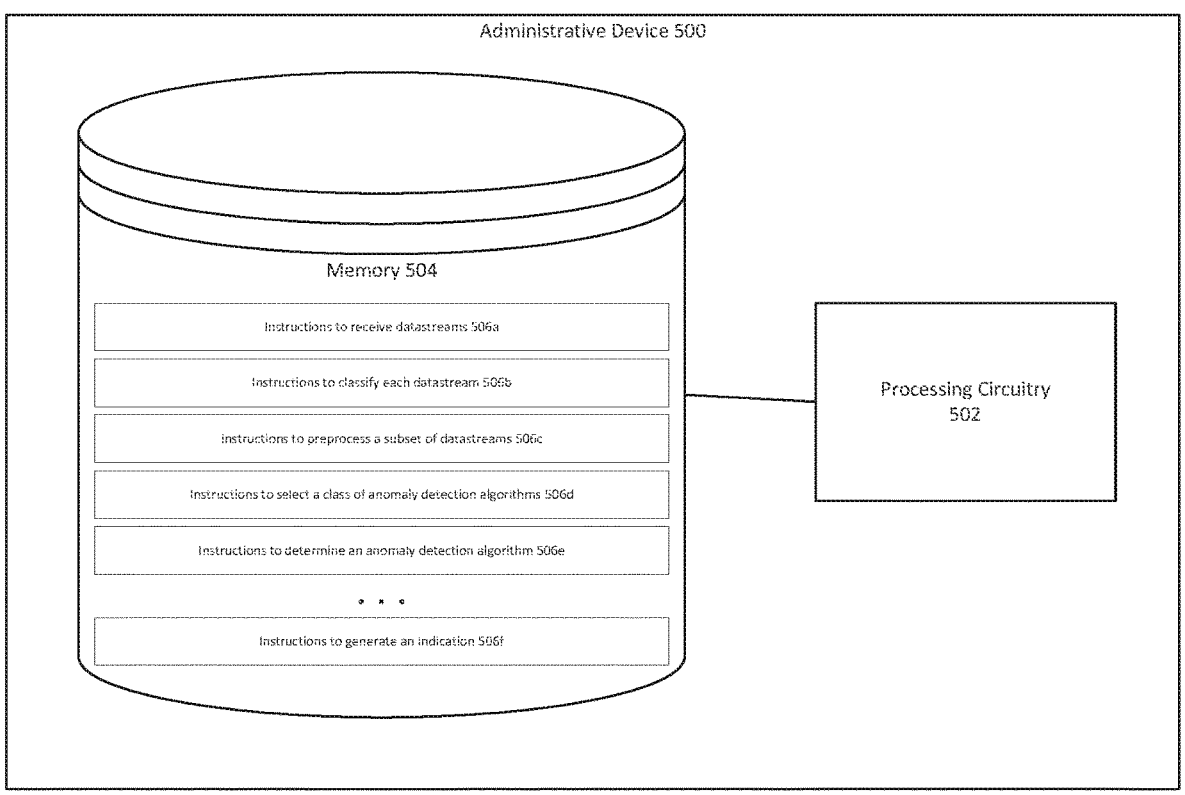
FIG. 5 illustrates an example administrative device.

FIG. 5 illustrates an example administrative device. Administrative device 500 includes processing circuitry 502 and memory 504. Memory 504 may be a non-transitory, computer readable medium and memory 504 includes instructions 506*a-f*. Instructions 506*a-f* may be executed by processing circuitry 502 to cause administrative device 500 to perform various functions.

In instructions 506*a*, datastreams are received from a plurality of sensors of a HPC system. In some examples, each datastream corresponds to a respective sensor. In some other examples, certain datastreams include multiple metrics, each of which correspond to a respective sensor. Datastreams may be received via a management network through a network interface card of the device. In some examples, certain sensors may be directly connected to the device via a serial data connection.

In instructions 506*b*, each datastream of each sensor is classified to a datastream model based on time-series observations of the each datastream. In some examples, a library of datastream models is maintained on the device. A machine learning classifier may be used to classify each datastream to a datastream model.

In instructions 506*c*, certain datastreams are preprocessed. In some examples, the certain datastreams are classified to certain datastream models. For example, datastreams classified to a step model may be preprocessed. Preprocessing may include transforming the datastream to make anomaly detection easier. For example, a datastream may be detrended, normalized, or transformed in any other appropriate manner.

In instructions 506*d*, a class of anomaly detection algorithms is selected from a plurality of anomaly detection algorithm classes for each datastream based on the classification of each datastream.

In instructions 506*e*, an anomaly detection algorithm is determined based on the class of anomaly detection algorithms selected in instructions 506*d*, as well as characteristics of each datastream and/or characteristics of the HPC system. In some examples, parameters such as frequency, amplitude, phase, and other relevant parameters used to determine the anomaly detection algorithm.

In additional instructions that are not shown in FIG. 5, an anomaly threshold may be determined for each datastream based on the respective anomaly detection algorithm. In some examples, the anomaly threshold is determined in relation to a mean value of an anomaly score generated by the anomaly detection algorithm. For example, if the anomaly score is a z-score of a datastream classified as a Gaussian noise function, the anomaly threshold may be set at a certain number of standard deviations from the mean.

In instructions 506*f*, an indication that a sensor associated with a datastream is acting anomalously is generated when a value of the datastream exceeds its respective anomaly threshold. In some examples the value of the datastream exceeds the anomaly threshold indirectly. In such examples, the anomaly score may be determined by the anomaly detection algorithm, and the value of the anomaly score may be related to the value of the datastream. For example, the value of the anomaly score may be an absolute value of a difference between the value of the datastream at a certain time compared to a mean value. In such examples, the anomaly score may be compared to the anomaly threshold in lieu of the datastream. In some examples, calculation of the anomaly score and comparison of the anomaly score to the anomaly threshold occurs continuously as additional time-series observations of the datastream are received at the device. In some examples, multiple anomalies that occur in rapid succession are grouped together into an anomaly region, and a single indication is generated for the anomaly region and forwarded to a network administrator.

A network administrator is a person, network service, or combination thereof that has administrative access to network devices and configures devices to conform to a network topology.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, inter-processor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A device, comprising:
   processing circuitry; and
   a memory including instructions that, when executed on the processing circuitry, cause the device to:
   receive a plurality of datastreams from a plurality of sensors of a high performance computing system;
   classify, based on a plurality of time-series observations of each sensor of the plurality of sensors, each datastream to one of a plurality of datastream models;
   select, for each datastream and based on a classification of each datastream, an anomaly detection algorithm from a plurality of anomaly detection algorithms;
   determine parameters of each anomaly detection algorithm of the plurality of anomaly detection algorithms, based on at least one of: characteristics of each datastream and characteristics of the high performance computing system;
   receive an anomaly score from each of the plurality of anomaly detection algorithms;
   determine, for each datastream an anomaly threshold based on each anomaly score;
   generate, when an anomaly score of the plurality of anomaly scores exceeds its respective anomaly threshold, an indication that the sensor associated with the respective datastream is acting anomalously.

2. The device of claim 1, wherein the device is further caused to preprocess each datastream prior to selecting, for each datastream and based on the classification of each datastream, the anomaly detection-algorithm of the plurality of anomaly detection algorithms.

3. The device of claim 2, wherein the preprocess includes at least one of: detrending or normalizing.

4. The device of claim 1, wherein each datastream of the plurality of datastreams includes multiple metrics, wherein each datastream corresponds to a group of related sensors and each metric of the multiple metrics corresponds to a respective sensor of the group of related sensors.

5. The device of claim 1, wherein the device is further caused to perform a plurality of time-series observations periodically, and wherein each datastream of the plurality of datastreams is classified based on the plurality of time-series observations within a pre-determined window of duration.

6. The device of claim 1, wherein the device is further caused to group a plurality of anomalies into an anomaly region, generate an indication for the anomaly region, and forward the indication to a network administrator.

7. The device of claim 1, wherein each datastream of the plurality of datastreams is periodically reclassified based on one of: expiration of a timer, significant alteration of characteristics of each datastream, or manual initiation by a network administrator.

8. The device of claim 7, wherein reclassification of each datastream of the plurality of datastreams includes determining a second anomaly detection algorithm of the plurality of anomaly detection algorithms for each datastream of the plurality of datastreams.

9. The device of claim 1, wherein each datastream of the plurality of datastreams is classified as a Gaussian noise function, and wherein each anomaly threshold is a z-score threshold for the respective anomaly detection algorithm of the plurality of anomaly detection algorithms associated with each datastream.

10. A method, comprising:
receiving, at a device, a plurality of datastreams from a plurality of sensors of a high performance computing system;
classifying, at the device and based on a plurality of time-series observations of each datastream of the plurality of datastreams, each datastream of the plurality of datastreams to one of a plurality of datastream models;
preprocessing a subset of the plurality of datastreams;
selecting, at the device and for each datastream and based on a classification of each datastream, an anomaly detection algorithm from a plurality of anomaly detection algorithms;
determining parameters of each anomaly detection algorithm, based on at least one of: characteristics of each datastream and characteristics of the high performance computing system;
receiving an anomaly score from each of the plurality of anomaly detection algorithms;
determining, for each datastream an anomaly threshold based on the anomaly score associated with the selected anomaly detection algorithm;
generating, when an anomaly score of the plurality of anomaly scores, exceeds its respective anomaly threshold, an indication that a sensor associated with the respective datastream is acting anomalously.

11. The method of claim 10, wherein preprocessing comprises at least one of: detrending or normalizing.

12. The method of claim 10, wherein each datastream of the plurality of datastreams comprises a plurality of metrics, wherein each datastream of the plurality of datastreams corresponds to a group of related sensors and each metric of the plurality of metrics corresponds to a respective sensor of the group of related sensors.

13. The method of claim 10, further comprising periodically performing a plurality of time-series observations, and wherein each datastream of the plurality of datastreams is classified based on the plurality of time-series observations within a pre-determined window of duration.

14. The method of claim 10, wherein generating the indication comprises grouping a plurality of anomalies into an anomaly region, generating an indication for the anomaly region, and forwarding the indication to a network administrator.

15. The method of claim 10, further comprising periodically reclassifying each datastream of the plurality of datastreams based on one of: expiration of a timer, significant alteration of characteristics of each datastream, or manual initiation by a network administrator.

16. The method of claim 15, wherein periodically reclassifying each datastream of the plurality of datastreams comprises determining a second anomaly detection algorithm for the plurality of datastreams.

17. The method of claim 10, wherein a datastream of the plurality of datastreams is classified as a Gaussian noise function, and wherein the anomaly threshold is a z-score threshold for the anomaly detection algorithm associated with the datastream.

18. A non-transitory, computer readable medium including instructions that, when executed by processing circuitry, cause a device to:
receive a plurality of datastreams from a plurality of sensors of a high performance computing system;
classify, based on time-series observations of each datastream of the plurality of datastreams, each datastream of the plurality of datastreams to one of a plurality of datastream models;
preprocess a subset of datastreams of the plurality of datastreams by at least one of: detrending or normalizing;
select, for each datastream of the plurality of datastreams and based on a classification of each datastream of the plurality of datastreams, a class of anomaly detection algorithms from a plurality of classes of anomaly detection algorithms;
determine an anomaly detection algorithm based on the class of anomaly detection algorithms from a plurality of classes of anomaly detection algorithms and at least one of: characteristics of each datastream of the plurality of datastreams and characteristics of the high performance computing system;
receive an anomaly score from each anomaly detection algorithm of the class of anomaly detection algorithms;
determine, for each datastream of the plurality of datastreams an anomaly threshold based on each anomaly score;
generate, when a value of a datastream exceeds its respective anomaly threshold, an indication that the sensor associated with the datastream is acting anomalously.

19. The computer readable medium of claim 18, wherein the device is further caused to perform a plurality of time-series observations periodically, and wherein each datastream is classified based on a plurality of time-series observations within a pre-determined window of duration.

20. The computer readable medium of claim 18, wherein the device is further caused to group a plurality of anomalies into an anomaly region, generate an indication for the anomaly region, and forward the indication to a network administrator.

\* \* \* \* \*